United States Patent
Kwan (10) Patent No.: US 7,660,758 B2
(45) Date of Patent: Feb. 9, 2010

(54) METHOD, APPARATUS AND PROGRAM FOR USER TO DETERMINE THE OWNERSHIP COST OF A MOTOR VEHICLE

(76) Inventor: Khai Hee Kwan, P.O. Box 1178, Sandakan, Sabah (MY) 90713

( * ) Notice: Subject to any disclaimer, the term of this patent is extended or adjusted under 35 U.S.C. 154(b) by 1503 days.

(21) Appl. No.: 10/728,222

(22) Filed: Nov. 27, 2003

(65) Prior Publication Data

US 2004/0128226 A1 Jul. 1, 2004

Related U.S. Application Data

(60) Provisional application No. 60/434,819, filed on Dec. 13, 2002, provisional application No. 60/438,090, filed on Jan. 2, 2003.

(51) Int. Cl.
*G06Q 40/00* (2006.01)
(52) U.S. Cl. .................. 705/36 R; 705/26; 705/38; 705/39; 705/20
(58) Field of Classification Search ............. 705/36 R, 705/26, 38, 39, 20
See application file for complete search history.

(56) References Cited

OTHER PUBLICATIONS

Miller, Stephen E (1995). Economics of automobile leasing: The call option value. The Journal of Consumer Affairs, 29(1), 199. Retrieved Aug. 1, 2007, from ABI/INFORM Global database.*

Matthew Wall Buy car online to beat British prices :[1GP Edition]. Sunday Times [serial online]. Feb. 25, 2001:6. Available from: ProQuest Information and Learning, Ann Arbor, Mi. Accessed Nov. 6, 2007.*

M. Sahibullah Prices set for Proton Waja :[Main/Lifestyle, 2* Edition]. New Straits Times [serial online]. Sep. 1, 2000:05. Available from: ProQuest Information and Learning, Ann Arbor, Mi. Accessed Nov. 6, 2007.*

Pauline Almeida, Azman Abd Ghani, Norainne M Shaib. Long wait for a Proton Waja. Malay Mail [serial online]. Nov. 6, 2001:06. Available from: ProQuest Information and Learning, Ann Arbor, Mi. Accessed Nov. 6, 2007.*

Sushma Veera, Rita Jong. Refund of booking fee for Proton Satria. Malay Mail [serial online]. Aug. 31, 2002:06. Available from: ProQuest Information and Learning, Ann Arbor, Mi. Accessed Nov. 6, 2007.*

Lionel Morais, AzIan Ramli, Harny Abu Khair. 'Can I get back booking fee?' asks car buyer. Malay Mail [serial online]. Jul. 21, 1998:06. Available from: ProQuest Information and Learning, Ann Arbor, Mi. Accessed Nov. 6, 2007.*

* cited by examiner

*Primary Examiner*—Kambiz Abdi
*Assistant Examiner*—Shahid R Merchant (57) ABSTRACT

An apparatus, method and program for user to contract a total ownership value by calculating premium (booking fee and buy back fee) both in monetary terms or premium. Calculation of booking fee and buy back fee for a motor vehicle is disclosed allowing the user to purchase and/or sell a vehicle at the both prices of his own choosing within a future period whereby premium in consideration provides a right but not an obligation.

20 Claims, 6 Drawing Sheets

METHOD, APPARATUS AND PROGRAM FOR USER TO DETERMINE THE OWNERSHIP COST OF A MOTOR VEHICLE

CROSS-REFERENCE TO RELATED APPLICATIONS

This application claims the benefit of priority from U.S. provisional application 60/434,819 entitled "Method, apparatus and program for user to determine the ownership cost of a motor vehicle", filed on Dec. 13, 2002, and No. 60/438,090 entitled "Method, apparatus and program for competitively auctioning tine sharing partnerships", filed on Jan. 2, 2003, the contents of both which are incorporated herein by reference.

STATEMENT REGARDING FEDERAL SPONSORED RESEARCH OR DEVELOPMENT

Not Applicable

REFERENCE TO A MICROFICHE APPENDIX

Not Applicable

BACKGROUND OF THE INVENTION

1. Technical Field

The present invention generally relates to a business method and more particularly, to an apparatus, method, program and system for securing the total ownership cost of motor vehicles or vehicles used for transporting of goods, services or passengers. After securing the total ownership cost, the user may then solicit others to share in the ownership of the asset using time sharing partnership which are offered through an auction routine. The invention uses financial modelling to determine the risk associated with sell and buy price to lock in the total ownership cost and more particular financial option models.

2. Background

Motor vehicle price, particularly in the luxury category is constantly changing as well as rising, with availability subject to present economic situation. More consumers would like to be able to lock in this price while they are still able or at least to lock in the future price to provide some certainty to their funding requirements to purchase the vehicle. Consumers would also like to be certain of a particular delivery date guaranteed by the manufacturer or dealer as the case may be. The current situation is not acceptable because upon payment of a deposit (generally 10 percent of the final price), the consumer is forced to accept whatever delivery date suitable to the manufacturer or dealer with no manner to track the delivery status of the vehicle. In addition, the final price might change and is passed to the consumer as extra cost. This invention calculates a booking fee as a premium according to heuristic rules corresponding with a pre-set delivery date, cost of funds and historical volatility of the prices. Therefore, the system allows the user to set this delivery date and further assigns a queuing number upon paying the calculated booking fee. Given that by paying the booking fee, a contract guarantying the final vehicle price is completed. The potential buyer will have more time to shop for the necessary financing knowing that the amount payable is fixed. The said contract however provides the buyer with the right to purchase at the fixed price but not the obligation in consideration for payment of the booking fee.

Just as equally important is for the motor vehicle owner to sell the motor vehicle in the future at a price agreeable now. In the same manner as a booking fee above, the motor vehicle owner in this case will pay a potential purchaser a buy-back fee in consideration to bind the purchaser in a contract that gives the vehicle owner the rights but not obligation to sell at a pre-agreed price in predetermined time period. The purchaser in this case can be the manufacturer of the motor vehicle or a dealer or a private individual organisation. In the event of a trade in, the pre-agreed price may represent the economic value of the trade in value. While this invention is intended for motor vehicle, one skilled in the art can be reasonably adapt it for aircraft, ships, motor bikes, trucks or any means of transportation. By paying a buy-back fee and a booking fee, the motor vehicle owner will be guaranteed the purchase price and selling price (subject to specifics in the contract), which means complete certainty to the total ownership cost of the vehicle as calculated by purchasing price plus booking fee plus buy-back fee less selling price. Therefore, it is a stated object of the invention to provide a motor vehicle purchaser with a certain purchasing price of a motor vehicle in the future, a certain selling price of the same vehicle in the future. It is also another stated object of the invention to provide certainty to the total ownership cost of the vehicle in accordance to the period as determined by the purchaser. By design, it is also another stated object of this invention to provide predictable capacity planning to the manufacturer by considering the number of vehicle option sold.

BRIEF SUMMARY OF THE INVENTION

The Inventor has developed a method of utilising a telecommunications service system host computer connecting to various terminal system including Automatic Teller Machines (ATM) which is linked to private networks or a public telephony system network or through the Internet where applicable. The system consists at least a network of computer system with a multi-communication interface running on Windows NT or Unix or Linux platform with programming using Java, Visual Basic, C plus language or any suitable programming language. A database such as MS SQL or Oracle is used to store, record and updates all the contracts and transactions.

Thus according to one embodiment of the invention there is provided, a process system comprising:

receiving an incoming request from a terminal through the public telephony system network via a modem or through the Internet or any connecting interface suitable for this purpose;

the said request comprises a vehicle delivery date, delivery destination, the vehicle type, the capacity of the vehicle, demand factor, aesthetic features of the vehicle and accessories for the vehicle;

determine if the request can be accommodated and locate nearest dealer;

if yes, respond with the booking fee as premium calculated from the above request data and wait for a response from user;

prompting the user to pay the booking fee;

if payment of the booking fee is authenticated, issue a receipt for the booking fee;

assigning a queuing number linked to the order;

allowing the user to check and track the status of the order in real time;

determine if user wants to consider fixing a buy back price of the same vehicle;

calculating the buy back fee in accordance to the selling price of the vehicle as decide by user, the accident history of driver, the age of driver and the driving experience of its usual driver;

prompting the user to pay the buy back fee now or invoice for payment on the delivery date as determined by the user;

where buy back fee is paid now, then the present value of this fee is calculated;

user is prompted to pay for said fee;

authenticating that the fee has been paid;

issue a receipt for buy back fee; and terminate transaction.

DESCRIPTION IN DETAIL OF THE PREFERRED EMBODIMENTS

The present invention is directed to an apparatus, program and method to determining an appropriate booking fee and buy back fee to contract motor vehicle price in the future. We use vehicle option fee, pricing and premium interchangeable. The final contract being offered in consideration of the said fee is known as a vehicle option contract.

Pricing such a booking fee is done by applying a Base Value as calculated from a modified Black Scholes model where traditional variables are transformed to take into account the different requirements in determining a booking fee for motor vehicle. For example, the exercise price in the said model is now the current price of a similar motor vehicle to reflect that the purchaser wishing to purchase at today's price as denoted below by X. Volatility which is measured as standard deviation is equated to the annualised standard deviation of motor vehicle price (normalised log) over the period and is denoted below by $\sigma$. Current price is a value for the current price of the motor vehicle and denoted by S. Risk Free Rate is the rate of investment in a risk free security denoted by r and time is a measured of years to delivery of vehicle and is denoted by T. Therefore according to the modified Black Scholes model as applied in this invention the base value here is calculated using said formula;

The booking fee is calculated as:

$$**BF=SN(d_1)-Xe^{-rT}N(d_2)$$

The buy back fee is calculated as:

$$**BBF=Xe^{-rT}N(-d_2)-SN(-d_1)$$

where
BF=Booking Fee and BBF=Buy Back Fee
S=current price of the motor vehicle.
X=fixed price of motor vehicle which the purchaser wants to purchase at, also known as the final amount payable for the vehicle. Usually this figure is by default the same as the current price for calculating Booking Fee. However when calculating the buy back fee, this value is the price which the motor vehicle owner wish to sell.
r=risk-free interest rate and $\sigma$=volatility of the motor vehicle logarithmic price
T=time to delivery date in years for calculating booking fee. When calculating Buy Back Fee, this refers to time/period to sell the motor vehicle.
N( )=area under the normal curve
$d_1=[\ln(S/X)+(r+\sigma^2/2)T]/\sigma T^{1/2}$
$d_2=d_1-\sigma T^{1/2}$ It is important to remember that both BBF and BF as calculated above are only base values. One must also include other factors in order to arrive at the final values which will be discussed later in detail. In the mean time, we have provided a sample calculation for a booking fee (base value) using the following assumptions;

As an example, assume the risk free rate is 10 percent, the final motor vehicle price in 1 year is US 76000, the standard deviation (volatility) is 10 percent, the time to delivery is 1 year, the current price is US 76000. This mean the purchaser is willing to pay US 76000 in one year time for a motor vehicle costing US 76000 currently. The base value booking fee is calculated to be US 7834. As for the buy back fee, we assume that the purchaser wish to sell the vehicle at US 20000 at the end of 3 years from the time of delivery with the risk free rate being the same. However because used motor vehicle prices are more volatile which means prices are more subjected to a higher volatility, we adjusted this to a value of 50 percent. The average price of a similar vehicle aged 3 years old is US 39908. The said base value buy back fee is then worth US 308.30. The reader is advised to perform volatility analysis of used car prices in order to determine the appropriate volatility since different motor vehicles have different retaining value which marks the demand in the used car market. If one is using Black Scholes then it has to be annuualised as well as exhibiting a log normal distribution. Speciality motor vehicles are particularly good in retaining its original value and some even increasing its value over time such as Ross Rolls series. Typically, we also see performance cars suffer depreciation of value faster than general-purpose vehicles over the first 3 years. Damage vehicles usually have only scrap value and therefore as mentioned before when calculating the buy back fee, other factors such as driving history of user, insurance coverage may be factorised into the fee as shown later to arrive at a reasonable final fee. However from the perspective of this invention, the purchaser for the first time will be able to guarantee the total ownership cost of owning the motor vehicle. In this example and assuming the base values respectively, we can see that after paying buy back fee and the booking fee and netting the purchase price and selling price, the purchaser would have spend only US 69899.40 to own the vehicle for a period of 3 years. Assuming that the owner wish to sell the vehicle at US 28000, the total ownership cost will be US 64523.68 with a buy back fee of US 943.09. However in practise, it is unlikely that the owner will sell a vehicle with a presumed market price of US 39908 at a price of US 28000. The buy back contract is only used to guarantee a price but not an obligation to sell at that price if there is a better price.

The table A below shows the differences between different strategies;

TABLE A

| | | | | | |
|---|---|---|---|---|---|
| AVE Market Value in 3 years | 39908 | 39908 | 39908 | 39908 | 39908 |
| PV Average Market Value | ($29,983.47) | ($29,983.47) | ($29,983.47) | ($29,983.47) | ($29,983.47) |
| Buy Back Price | 20000 | 28000 | 35000 | 50000 | 55000 |
| PV Buy Back Price** | ($15,026.30) | ($21,036.81) | ($26,296.02) | ($37,565.74) | ($41,322.31) |
| Booking Fee adjusted* | 8617.4 | 8617.4 | 8617.4 | 8617.4 | 8617.4 |
| Buy Back Fee | 308.3 | 943.09 | 1856.45 | 4954.4 | 6312.4 |
| Vehicle Payment (VP) | 76000 | 76000 | 76000 | 76000 | 76000 |
| Total Ownership Cost (TOC) | $69,899.40 | $64,523.68 | $60,177.83 | $52,006.06 | $49,607.49 |
| Savings (VP less TOC) | $ 6,100.60 | $11,476.32 | $15,822.17 | $23,993.94 | $26,392.51 |
| Assuming no Booking Fee Selling at Buy Back Price plus Buy Back Fee | $61,282.00 | $55,906.28 | $51,560.43 | $43,388.66 | $40,990.09 |
| Selling at Market Value | $46,016.53 | $46,016.53 | $46,016.53 | $46,016.53 | $46,016.53 |
| Selling at Market Value plus Buy Back Fee | $46,324.83 | $46,959.62 | $47,872.98 | $50,970.93 | $52,328.93 |

**Buy Back Price adjusted to take into account the discount rate at 10 percent over 3 years
*Booking fee was paid in year 0 so we adjusted it to year 1 to where all payments are made.

In particular one can notice that by placing a buy back price at the high end, the ownership cost is reduced. However this could be explained by the low buy back fee which means in the long run, this fee will increase to compensate for the potential loss suffer. Otherwise, the manufacturer will adjust the volatility to reflect this. At the same time placing a buy back price at the low end but not using the contract and instead selling at the prevailing market price means a minor difference only. Another model that is most useful for practical reasons to calculate the buy back fee can be undertaken by mapping the possible outcomes as below. Instead of relying on continuous data as in Black Scholes, we can appreciate that pricing data for motor vehicle are discrete. This is to say that data may be sparse and hence we do not have as many periods so to preserve our assumptions under Black Scholes. The Table B below shows our price expectation of a motor vehicle over time immediately upon purchase under the Tree Method.

TABLE B

| | t(0) | t(1) | t(2) | t(3) |
|---|---|---|---|---|
| Selling Price Interest Rate 10% | 30052 | 33057.2 | 36362.92 | 39999.21 |
| | | | | 55404 |
| | | | | 0 |
| | | | 61560 | |
| | | | 0 | |
| | | 68400 | | 46170 |
| | | 2239.43 | | 0 |
| Price | 76000 | | 51300 | |
| Booking Fee | 116.4723 | | −1847.53 | |
| | | 57000 | | 38475 |
| | | 3822.913 | | 1524.212 |
| | | | 42750 | |
| | | | −6387.08 | |
| | | | | 32062.5 |
| | | | | 7936.712 |

This table shows that in 3 years time, the price can actually be US 55404 or US 46170 or US 38475 or US 32062.5. At time 0, we can see that the motor vehicle price will have two outcomes in time 1 which is US 68400 or US 57000. And in time 2, we can see that US 57000 has two outcomes which is US 51300 or US 42750 and so on. The figure below the price shows the booking fee as calculated below; Calculation of the buy back fee at the end of the period 3 is simply the max (selling price—value at time 3 or 0). Suppose the vehicle is valued at 32062.5 and we can sell it at 40,000 then the value of this buy back fee is then the difference 7937.50. To calculate values in the time 2 and backwards;

We used this formula for Buy Back fee=H*MVP−B

R=Risk Free Rate say 10% means R=1.10

Where H=(P11−P10)/(S11−S10) and B=(P11*S10−P10*S11)/((S11−S10)*R)

Hence Buy Back Fee=−6387.08 in time 2. With the above formula, we can calculate all other buy back fee until we reach the buy back fee in time 0. For calculation of booking fee, we use the max (Value at Time 3—selling price or 0). A simple recursive function can be used to repeat each tree node calculation.

The above method for buy back fee when compare with Black Scholes can be tabled below.

TABLE C

| Selling Price | 20000 | 28000 | 35000 | 40000 | 50000 | 55000 |
|---|---|---|---|---|---|---|
| Black Scholes | 308.3 | 943.09 | 1856.45 | 6476.5 | 4954.4 | 6315.4 |
| Tree Method | 0 | 0 | −5231.4 | 116.5 | 13144.1 | −30821.7 |

As one can recognise the Black Scholes model requires the user to identify the volatility while for the Tree Method, we try to estimate the expected values only as a pre-requisite. One advantage of the Tree Method is that up and down prices can be estimated instead of calculating the volatility as in Black Scholes as the determining factor. One skilled in the art will be able to better approximate the Tree Method using techniques such as binomial option pricing model where large data are available and assuming log-normal distribution.

In all examples above, we have excluded road tax, insurance or the present value of the buy back fee etc for simplicity. Alternatively, instead of the motor vehicle owner paying a buy back fee which compels the counter-party, in this case the manufacturer to purchase the vehicle at the pre-agreed price, the manufacturer can also compel the motor vehicle owner to sell the motor vehicle back to the manufacturer at the pre-agreed price usually through a vehicle option contract. This method is particularly useful for manufacturers where they are required by law to recycle their motor vehicles. Hence the buy back fee can be incorporated into the purchase price.

As mentioned, to calculate the base value for both the buy back and booking fee, we use the Black Scholes model although other models may be used where one skilled in the art will be able to consider given the assumptions build into each model. The characteristics and assumptions build in Black Scholes model is well known in the art of finance and in the field of financial options in determining the option price of stocks. However before the disclosure of this application, there is no known use for this model in the field of determining booking fee or buy back fee for motor vehicle in its unmodified form. Furthermore the model is only use to determine a base value, which must be further applied with other factors in order to arrive at the final booking fee or buy back fee as discussed below.

For example, it is well known that manufacturers have limited capacity within its production. Therefore any delivery dates being considered must also take into account such capacity and various delivery methods. For example a customer living in another country will require suitable transportable means to deliver the motor vehicle which means the delivery date must further be adjusted to reflect this need and hence the cost of the booking fee. In situation where the demand is so great for a particular motor vehicle, the delivery date may not be acceptable to the manufacturer. However this revised date may not be suitable for the potential purchaser and hence the transaction has to be repeated until a suitable date agreeable by both parties is reached. Alternatively, without adjusting the delivery date we can adjust the booking fee to be higher so that it will attract the manufacturer to accept this order. Alternatively the potential purchaser may solicit other potential purchaser to purchase their booking contract with the manufacturer by offering a high premium in return. For example, purchaser A may have already paid a booking fee of US 2000 scheduled for delivery on a certain date which purchaser B is interested in. We further assume that purchaser B is willing to pay US 5000 for purchaser's contract to be assigned to purchaser B. Therefore if purchaser A is agreeable then the booking contract will be assigned to purchaser B. In this invention, we assumed that booking contracts and buy back contracts are transferable by a simple assignment not gross. And exchange market can be used and one skilled in the art of electronic exchange will be able to modify for this purposes. Furthermore, other factors such as driving experiences and accident history of drivers should be consider when assessing the buy back fee as explained below in detail.

While in this invention, we are assuming that the host computer is within one manufacturer's system and hence able to determine the suitability of each request in accordance to its production capacity and delivery time, one skilled in the art will be quick to see that such a host computer can be programmed to service several manufacturers in different locations over a network. It can even be linked to several manufacturer or dealers from different companies or it can be a dealer wanting to offer these option contracts directly as a method to hedge its future inventory. Else, the central controller can be the manufacturer or dealers who is offering the vehicle options.

Figure 1:
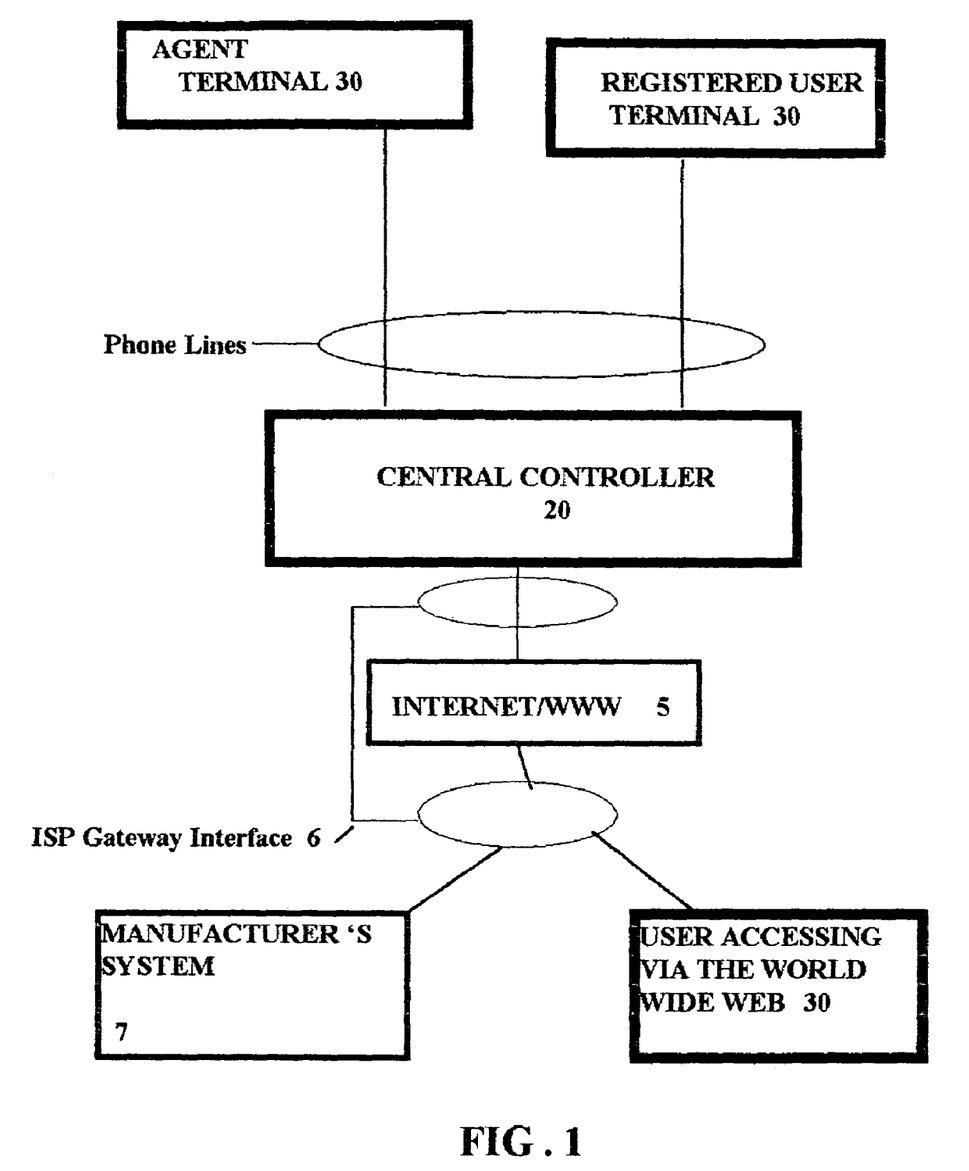
FIG. 1. Depicts the overall system block diagram of a preferred embodiment of the present invention.

FIG. 1 is an overall system block diagram of a preferred embodiment of the present invention. In this embodiment, central controller 20 is linked up to at least one dealer terminal 30 or registered user 30. This linked up can also be through the Internet through the Internet Service Provider (ISP) Gateway 6 or a network system with hypermedia capabilities whichever is preferable by the seller/provider at that time depending on economic costs of the system. Three terminals are depicted in FIG. 1 but any number of terminals can be used including those linked via the Internet 5. The link between the terminal 30 and the central controller 20 does not have to be a physical link—it can, for example be a link via a modem, as described in the subsequent description, or any other telecommunication link including wireless systems. Said controller 20 is also link to a motor vehicle manufacturer's system at 7. In this embodiment we are assuming that the controller 20 is dedicated to the system at 7 although as mentioned previously, it will be just as easy to connect to as many motor vehicle manufacturer systems given their participation in the booking fee scheme.

A request can be initiated from any one of the dealer/users terminal 30. The information required to implement the transaction is passed until the transaction is complete. The central controller 20 keeps track of all transactions including transactions in the system. The system depicted in FIG. 1 may be embodied in hardware specially provided to implement the present invention. Alternatively, the system may be implemented using existing infrastructure such as the Internet via an ISP Gateway 6 interface. The preferable protocol is TCP/IP.

The hardware and communication links may be change to incorporate this invention such as by way of reprogramming an existing server or by adding an additional file server (with or without a CPU dedicated to the transactions). Alternatively, the subject invention can be implemented by using existing hardware and software entirely by making appropriate software updates.

Figure 2:
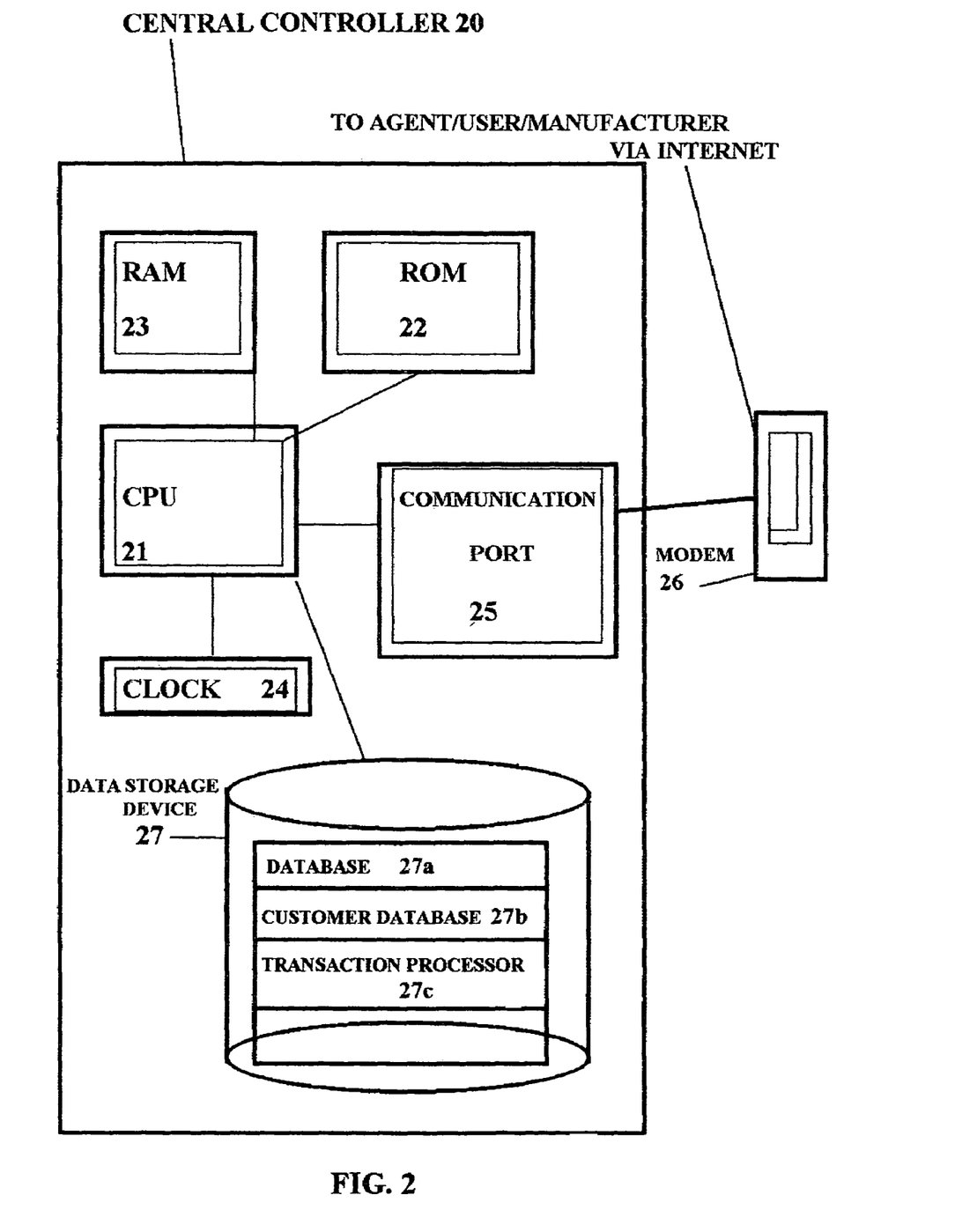
FIG. 2. Depicts the block diagram of the central controller

FIG. 2 is a block diagram of a preferred central controller 20. The central controller includes a CPU 21 which performs the processing functions of the controller. It is also includes a read only memory 22 (ROM) and a random access memory 23 (RAM). The ROM 22 is used to store at least some of the program instructions that are executed by the CPU 21 such as portions of the operating system or BIOS or a program and the RAM 23 is used for temporary storage of data. A clock circuit 24 provides a clock signal which is required by the CPU 21.

The use of a CPU 21 in conjunction with ROM and RAM and a clock circuit is accepted to those skilled in the design of the CPU based electronic circuit design. The central controller 20 also includes a communication port 25 which enables the CPU 21 to communicate with devices external to the central controller 20. In particular the communication port 25 facilitates communication between the modem 26 and the CPU 21, so that information arriving from the modem 26 can be processed by the CPU 21 and the CPU 21 can send information to remote location via the modem 26.

While the illustrated embodiment uses a modem for communicating with devices outside the central controller, it should be understood readily that other methods of communicating with external devices may be used instead of the modem. These other methods include hard-wired connections, wireless such as radio frequencies, fibre optic lines, network card etc.

The CPU 21 can also store information to and read information from, the data storage device 27. This data storage device 27 includes a transaction database 27a and a customer database 27b, which are described below. In addition, it includes transaction processor instruction 27c which can be read by and executed by the CPU 21, thereby enabling the CPU 21 to process transactions. While FIG. 2 depicts separate transaction and customer databases, a single database that incorporates both of those functions may be used.

Figure 3:
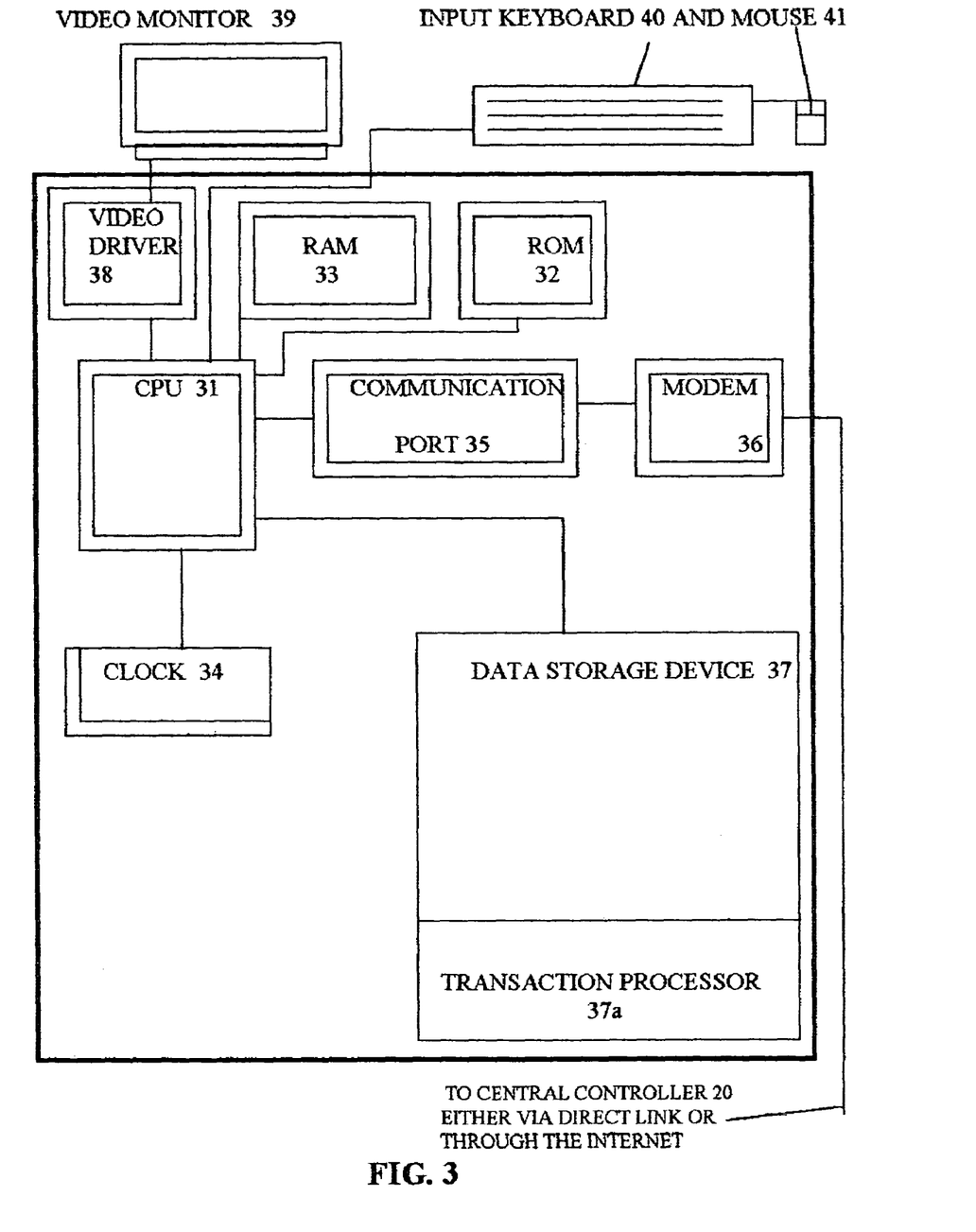
FIG. 3. Depicts the block diagram of the dealer terminal and Internet connections.

FIG. 3 is a block diagram of a preferred dealer or user terminal which can be located at a dealer's office or private home, or any establishment having the authority to lend itself to this network. As discussed there can be a number of dealer terminals 30 linked to the one central controller 20. Like the central controller describe above, the dealer terminal 30 includes a CPU 31, ROM 32, RAM 33 and a clock circuit 34. The dealer terminal 30 also include a communication port which interfaces with a modem 36 that facilitates communication between the dealer terminal 30 and the central controller 20. Of course instead of a modem 36 other communication devices can be used as shown above for the central controller 20. A standard computer such as an IBM PC, Apple Macintosh, running appropriate custom designed software may be used as the dealer terminal.

The dealer terminal 30 also includes an input device 40 to receive input from an operator or user. Any of a wide variety of input devices would be suitable including touch screen, mouse 41, keyboard 40. The input device 40 may interface directly with the CPU 31 as shown in the figure. Alternatively an appropriate interface circuit may be placed between the CPU 31 and the input device 40.

The dealer terminal 30 also includes a video monitor 39 for conveying information to the operator. While the most preferred video monitor 39 is a CRT, other video display devices including LCD, LED and thin film transistor panels, may be used as well. A video driver 38 interfaces the CPU 31 to the video monitor 39 (or to any other type of video display device). The dealer terminal 30 also includes a data storage device 37 in which transaction processor instructions 37a are stored. These instructions can be read by and executed by the CPU 31 thereby enabling the CPU 31 to process transactions. Typically the dealer terminal will run a browser type of software which enables it to access information via the Internet 5 and onwards to the central controller 20.

Figure 4:
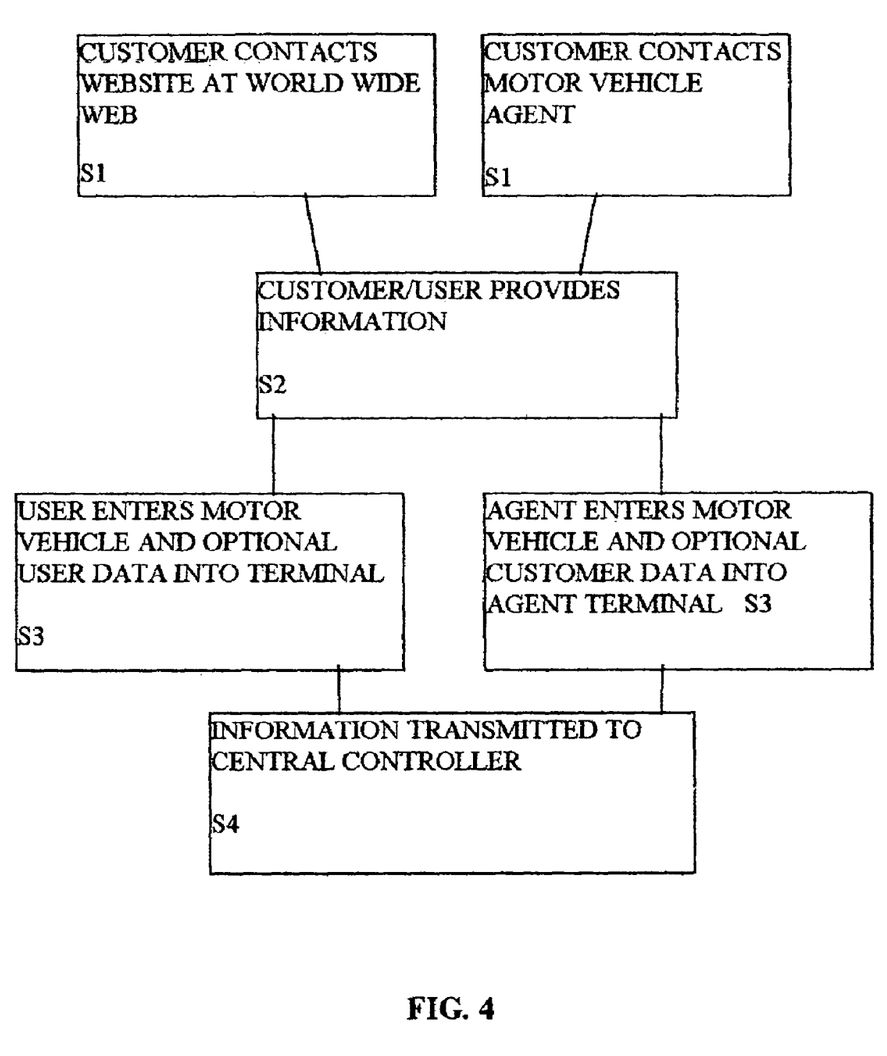
FIG. 4. Depicts the flow chart depicting initiation of a transaction in the dealer terminal or through an Internet connection.

FIG. 4 is a flow chart depicting the initiation of a transaction using an dealer terminal 30. The steps of the process shown in FIG. 4 may be implemented in a computer program that may be installed at the dealer terminal or remotely on the central controller 20. For example a computer readable medium (such as a floppy disks or CD-ROMs) which is then stored in memory, in this case the data storage device 37 (Shown in FIG. 3). Alternatively, although not so describe below, the computer program be installed at the central controller 20 from a computer readable medium and then stored therein in one or more of the ROM memory 22, RAM memory 23 and data storage device 27 for access and use by dealer terminals 30 as required.

The process starts when a customer contacts a motor vehicle dealer in step S1. Alternatively, a registered user can access it through the ISP Gateway 6 by using browser programs by applying the command http://www.vehicleoption.com which connects to the central controller 20. Where possible mirror sites are available for faster access. The customer provides a menu with motor vehicle information in step S2. This information comprises for example: model, current price, accessories, and vehicle type and date of delivery including an option for a buy back. If this option is selected then the user or dealer will need to complete this details as well later. Otherwise, the menu can provide either for a booking fee or buy back fee only. Either selection would require the user or dealer to enter appropriate information. For a booking fee or premium, the user or dealer can select the model, vehicle type and accessories and the date of delivery. For a buy back, the user can provide the model, the price to sell, the time to sale as well as their historical driving experience, age and insurance coverage as an example. Any type of information may be inputted at this stage as long as they are provided in order for the central controller to make a proper analysis. These information is entered by either the customer or by an dealer, into the dealer terminal 30 in step S3. Customer data such as the customer's name, address, and telephone number, age, income if any, may also be entered into the dealer terminal 30 in step S3. The said information and the customer data are then transmitted to the central controller 20 in step S4.

Returning to FIG. 3, each of the steps S1-S4 described above are executed by the CPU 31 which is executing transaction processor instructions 37a stored in data storage device 37 which are loaded on to memory 32 for execution. The communication with the central controller 20 takes place via the communication port 35 and modem 36 or as the case may be, with Internet 5 through ISP Gateway Interface 6.

Figure 5:
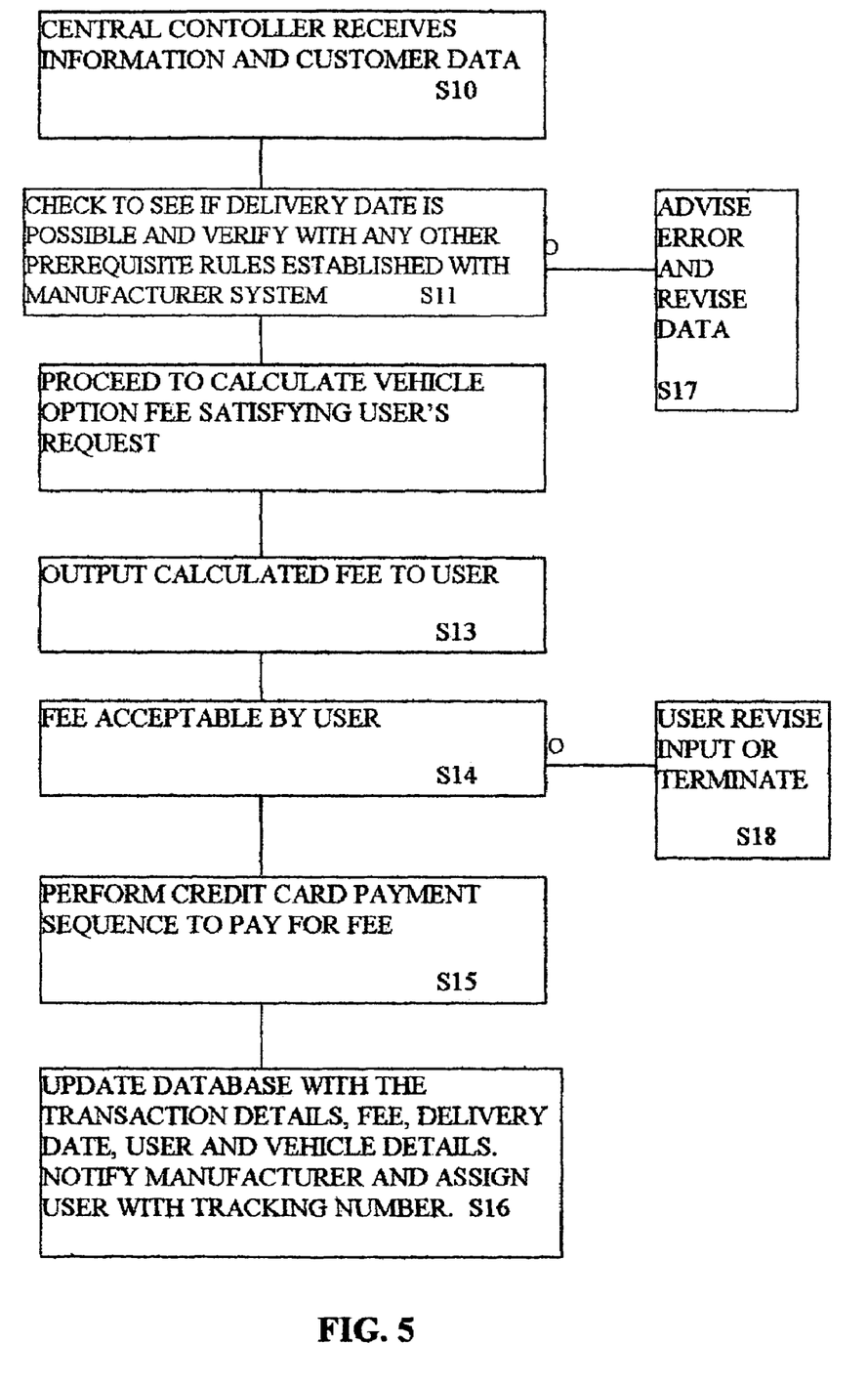
FIG. 5. Depicts the flow chart depicting the operation of controller and determining the booking fee.

The information (and optional customer data) from the dealer terminal 30 is received by the central controller 20. FIG. 5 is a flow chart of the operation of the central controller 20 after receiving said information from the dealer terminal 30. The steps of the process shown in FIG. 5 may be implemented in a computer program that may be installed in the central controller 20 from a computer readable medium and then stored therein in one or more of the ROM 22, the RAM 23 and the data storage device 27 (shown in FIG. 2). The central controller 20 receives the information in step S10.

In deciding whether to accept a purchaser's requirement and prior to calculating any premium for consideration, it is appropriate that certain rules are used as a base checker such as whether the delivery date is suitable for the requested motor vehicle. This takes into account the current capacity and the delivery mode of the motor vehicle. For example, if the capacity for the time period is already exhausted then manufacturer must return a message of rejection and ask for another delivery date. If the capacity can accommodate this order then the manufacturer's system must also check for delivery possibility to be within or on the required delivery date itself. It is well known that shipping time is prescheduled by shippers and therefore the vehicle must be ready by a certain date in order to be shipped. Such preliminary checking is required and these rules should be build into the program as determined by the manufacturer's system in order to satisfy the order requirements. Provided these are satisfied, then the program will proceed to calculate the fee required to contract as in S12 otherwise, it will return an error message with the appropriate action for user to change the delivery date or the model or terminate as in S17. Such rules are stored in the database 27 or maybe embedded in the main program which are called when required.

As the case maybe, the calculation of the booking fee or premium may be determined by multiplying the result of the modified Black Scholes by other factors. The modified Black Scholes being used here is also known as the base value. In addition, it is well known in the art that the calculated premium can be adjusted manually or automatically from time to time according to market demand and supply. Say the calculated price is X but there are no takers as can be seen from the logs kept. Therefore, the manufacturer or programmer may adjust X to be lower or this can be done manually as this X is merely an indicative fair value price.

The other factors which are also known as the adjusting factors are calculated based on heuristic rules unique to the chosen manufacturer. Such rules are stored in the database or maybe embedded in the main program which are called when required. Appropriate call functions can be used to call these rules. It is preferred that these rules are updateable remotely by the institution concerned on a real time basis. For example, the demand factor may be currently standing at 1.20 but if more and more people should opt for this particular motor vehicle, it may be increase to 1.50 to provide for a higher booking fee. These factors are build from past demand information and are subject to changes to suit individual manufacturer's requirements. For example, if the institution should decide to increase the production capacity for a particular model in the future then they might want to reduce the demand factor to say 0.7 so that a lower booking fee will be determined which in turn might attract more purchasers. Adjusting factors are necessary in order to take into account the market requirements for a particular motor vehicle model.

Alternatively instead of using the modified Black Scholes to calculate the base value, a base price may be use. Said base price may be a fraction of the motor vehicle price at the current time for example 6 percent. Generally the fraction will increase near the delivery date.

The variables or adjusting factors used can be continuously or discretely variable. One set of discretely varied variables is described in the table below, which assumes the base price to be 6 percent of the current motor vehicle price. There are according to this invention many ways of calculating the value and as such these methods are only for demonstration purposes.

D A factor relating to the period before delivery date.

| | |
|---|---|
| 0.25 year | 0.95 |
| 0.5 year | 1.0 |
| 0.75 year | 1.2 |
| >=1 year | 1.5 |

L A factor related to the expected interest in the motor vehicle. In this example, L increases as the expected demand increases.

| | |
|---|---|
| High Demand | 1.2 |
| Medium | 1.0 |
| Low demand | 0.7 |

V A factor relating to the historical volatility of the motor vehicle prices. In this example, V increases as price volatility increase as measure in standard deviation terms or SD increases.

| | |
|---|---|
| Changes by more than 9 percent on a year to year basis | 1.3 |
| Some Changes of up to 8 percent on a year to year basis | 1.1 |
| Stable No Changes | 0.7 |

Using these variables, a suitable algorithm for calculating an appropriate adjusted booking fee is as follows:

$$Fee = B*D*L*V$$

B represents a base value that can be calculated from a modified Black Scholes or similar type of formula or using preset rules under a Base Price method. The important basis for this value is to be able to quantify the price movement of the vehicle cost and take into account the future value at a particular discount rate over a predetermined period. Note that if Black Scholes is used in the above, then V and D are not required as they are already build into the formula. Therefore one should be cautious so that these factors are not repeated.

It should be mentioned that conditions and changes may be made to the above formula from time to time to reflect changes in the environment. The above is only an example for demonstration purposely. More sophisticated formula may be used. Once the booking fee or premium has been calculated as shown above, it is transmitted to the customer in step S13.

Using the previous example, a customer wants to purchase a vehicle option contract to buy a motor vehicle at USD 76,000 one year from now. Further assume that the delivery date is the same which is 1 year from now (1.5), the motor vehicle has a medium demand (L) of 1.0 and the motor vehicle price standard deviation is 10 percent (V) 1.3.

The Base Value is USD 76 000*0.06=USD 4, 560 and the adjusted booking fee is USD 8892, calculated as follows $$4560*1.5*1.0*1.3=8,892$$

If we use a modified Black Scholes model as a substitute to the base price method, the calculated value is 7834*1.5=11, 751

The variables used in the modified Black Scholes are 10 percent in risk free rate, 1 year to delivery, standard deviation is 10 percent, the current cost is USD 76,000 and the user is want to pay USD 76,000 in 1 year time. All adjusting factors remained the same for both examples. An alternative is to find the average between the two solution as an approximation resulting USD 10321.50

After the premium information is transmitted to the customer in step S13, the customer decides whether to accept the contract in step S14. If he decides to purchase the contract, the system can process the contract by billing the customer's credit card in step S15. Of course, alternate methods of payment may be used instead of a credit card, including payment by cash, credit, check, debit card, gift certificate, and the like each consistent with monetary value equivalent to the above. If the customer decided not to contract during step S14, the customer is given a chance to revise the vehicle information in step S18 or exit. By adding more flexibility in his ownership plans, the customer may be able to determine a premium that is suitably priced as well as satisfying his request. The credit card transaction S15 may be carried out by the central controller 20 or by the dealer terminal 30 with all records updated instantly S16. Transactions processed through the dealer terminal 30 may be carried out using the same modem 36 that is used to communicate with the central controller 20. Alternatively additional modem (not shown here) may be included in the terminal 30 to process the credit card transactions.

Alternative the normal credit merchant account may be used to facilitate the transaction. After the sale is completed, the transaction database (27a in FIG. 2) is updated in step S16 to reflect the fact that a particular contract has been sold.

The customer database (27b in FIG. 2) may also be updated to indicate that a particular customer has purchased a given contract. This customer database may be used for various purposes including billing, messaging and marketing particularly using Internet based technology such as electronic mails subject to authorisation by the customer.

Having calculated the booking fee, the purchaser may be required to proceed to contract the buy back fee if this option is selected.

To determine the total ownership cost both booking fee and the buy back fee must be considered. However it is not unusual for customers to select the buy back fee only or the booking fee only reflecting different requirements and circumstances. This is not obligatory but in order to calculate the total ownership cost the purchaser need to consider this step as well. The calculation of the buy back fee is similar to the booking fee except that it uses different adjusting factors such as below and follow similar steps as describe in FIG. 5 for booking fee;

E A factor related to the number of driving years of the person who normally will be using this motor vehicle. In this example, E increases as the year decreases.

| | |
|---|---|
| 1-2 years | 1.2 |
| 3-5 years | 1.0 |
| above 5 years | 0.7 |

A A factor related to the age of the person who is normally driving the motor vehicle. In this example, A increases as the expected demand increases.

| | |
|---|---|
| 16-20 years old | 1.2 |
| 21-25 years old | 1.0 |
| 26-30 years old | 0.7 |
| 31-40 years old | 0.7 |
| 41-60 years old | 0.8 |
| 61-80 years old | 0.9 |

AH A factor related to the reported accident history of the driver who normally drives the motor vehicle.

| | |
|---|---|
| No accident | 0.8 |
| One accident | 1.0 |
| More than one accident | 1.3 |

TY A factor related to the type of vehicle being sold.

| | |
|---|---|
| Sports | 1.3 |
| Utility | 1.0 |
| 4 door Sedan | 1.0 |
| 3 door hatch back | 1.1 |

If we use the Tree Model or Binomial approximation method as calculated above, the unadjusted figure is US 1978.44 given volatility is 50% and time to sell is 3 years and selling price is US 35,000. Note that Black Scholes provides a figure of US 1856.45. Again we can determine the average of this two 1917.44. This figure is then multiply with E, A, AH TY. In our example, we assume that the driver has been driving for more than 5 years hence 0.7, the age of the driver is 42 years old hence 0.8, has no accident before 0.8 and the type of vehicle is a 4 door sedan hence 1.0.

Therefore the buy back fee is calculated as 1917.44*0.7*0.8*0.8*1.0=859.02

While the above factors are sufficient for a typical motor vehicle, other factors should not be ignored such as past usage history, kilometers per year, insurance coverage for the motor vehicle. In addition, final adjusting factors may be added to the final value payable to the purchaser such as in terms of kilometers reading on the motor vehicle at the time of sale, general condition of the motor vehicle and occurrence of accidents as shall be explained below.

OD A factor related to the odometer reading in the motor vehicle aged 3 years at the time of sale.

| | |
|---|---|
| 10-19,999 kilometres | 1.4 |
| 20-39,999 kilometres | 1.3 |
| 40-59,999 kilometres | 1.2 |
| 60-79,999 kilometres | 1.1 |
| 80-99,999 kilometres | 1.0 |
| 100-149,999 kilometres | 0.9 |
| above 150,000 kilometres | 0.85 |

Note that different OD factors should be derived for different aged vehicles.

CD A factor related to the physical condition of the motor vehicle at the time of sale.

| | |
|---|---|
| Good | 1.2 |
| Average | 1.0 |
| Poor | 0.8 |
| Defective | 0.6 |
| Damage | 0.2 |

The precise definition of 'Good' or 'Average' will be decided by the manufacturer or dealer who will be accepting the car but such guidelines must be provided to the potential seller. There are scientifically measurable standards involved here for example; measuring the quality of the paint but other factors such as upholstery are subjective. Defective would mean either the brake system is not working or electrical is not working etc. Damage would mean the motor vehicle has been involved in an accident, which has yet to be repaired at the time of the sale or inspection. One trained in the skill of motor vehicle assessment and valuation would be able to provide the parameters to enable these requirements better.

These factors only affect the value payable at the end and not the buy back fee. In short, the final selling price is not permanently fixed and is subject to said factors. Using the same example above where the purchaser has indicated a value of US 35000 at the end of 3 years. Further assuming that the vehicle has done 40,000 kilometers and in average condition.

35000*1.2*1.0=42000

In short such adjusting factors are used to encourage the purchaser to maintain the condition of the vehicle which as mentioned previously may be used as a trade in value for the next car which further reduces the total cost of ownership.

Note that the factors are not to be limited to the above and one skilled in the art will be able to include other factors suitable to the type of transporter.

Figure 6:
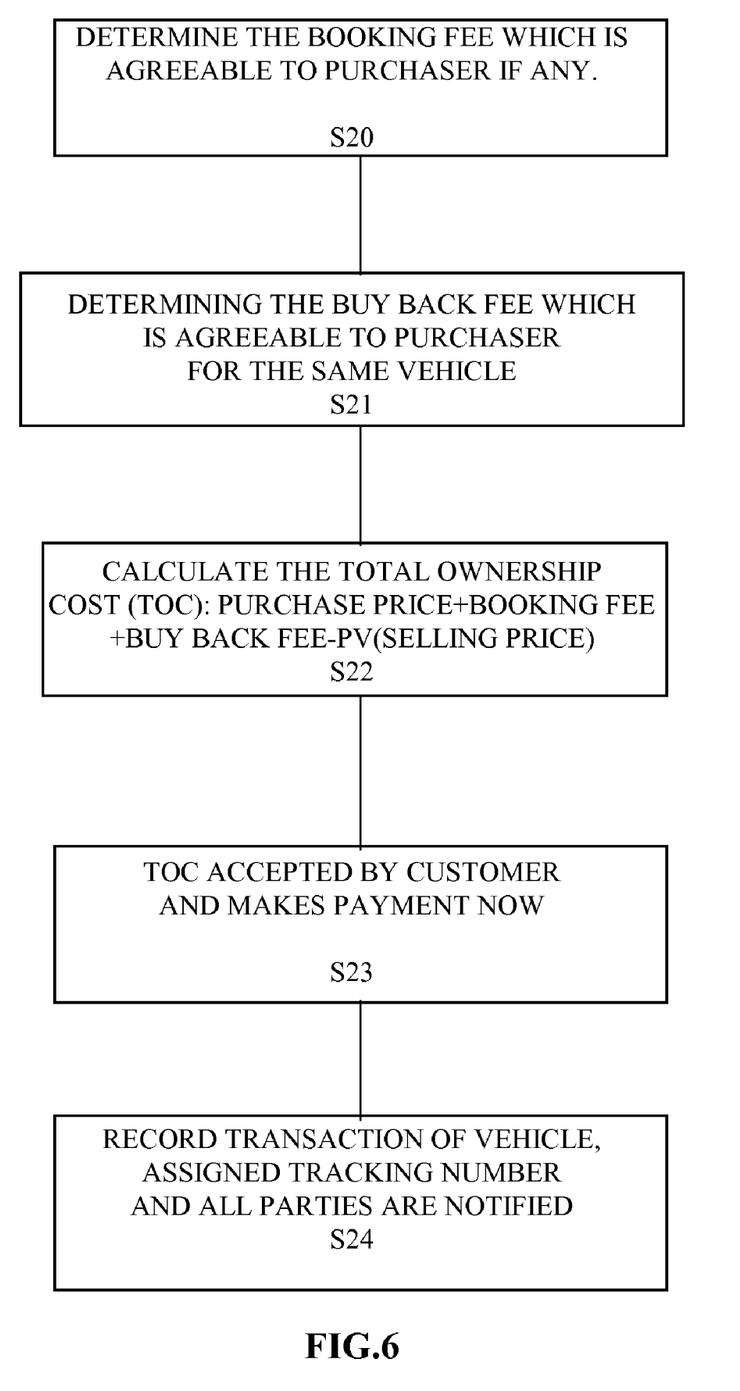
FIG. 6. Depicts the flow chart of the operation of the central controller 20 after for determining the total ownership cost.

FIG. 6 shows the flow chart of the operation of the central controller 20 after for determining the total ownership cost.

FIG. 6 provides the programmable method for a purchaser to own a motor vehicle for a stated period with enjoying contracted entry and exit prices. In S 20, the central controller calculates the booking fee and in S 21 the buy back fee. In S 22, the central controller calculates the total ownership cost ('TOC') which provides an agreed cost to own a motor vehicle. In S 23, the usual payment is made to satisfy ownership. S 24 provides the updating and notification functions on completion of the transaction. If the type of vehicle is available immediately then the booking fee can be ignored and hence reducing the TOC further. This is particularly useful since our above method has shown that compare with uncertain selling prices the TOC seems a prefer way of owning a motor vehicle in the future. This invention provides methods to manage this TOC in order to determine the purchasing decision.

In more complex program, the value of the total ownership cost can be inputted first with the required years of ownership. The program will then work backwards to determine the suitable vehicle, which then the purchaser will either agree or reject the output provided by the system. One skilled in the art of mathematics will be able to reprogram for such utility.

Having thus described our invention, what we claim as new and desire to secure by Letters Patent is set forth in the following claims. While the present invention has been described above in terms of specific embodiments, it is to be understood that the invention is not limited to the disclosed embodiments. On the contrary, the present invention is intended for various modifications and equivalent structures included within the spirit and scope of the appended claims.

The invention claimed is:

1. A method for determining vehicle option premium to purchase or sale a new vehicle over a network connected to a central controller and a plurality of terminals, comprising the steps:
   providing a vehicle manufacturer system linked to said network;
   receiving over said network at said central controller, vehicle pricing information comprising first data representative of time to delivery of said new vehicle, a second data representative of a delivery destination of said new vehicle and third data representative of a price said user is willing to pay for said new vehicle;
   calculating at said central controller the vehicle option premium based on said first data and said third data;
   outputting the vehicle option premium to the user for decision over said network;
   upon acceptance by said user of said vehicle option premium at said central controller, performing a payment transaction for said premium or a deposit over said network; and
   creating a vehicle option contract to lock in said third data.

2. The method according to claim 1, whereby said calculating is using binomial option pricing model.

3. The method according to claim 1, wherein for said calculating step the vehicle option premium is based at least in part on formula:

$$\text{Vehicle option premium} = B*D*L*V$$

B represents a base value, D is factor related to a period before delivery date

V is factor related to a historical volatility of prices for the new vehicle and L is factor related to expected interest in the new vehicle.

4. The method according to claim 1, wherein the calculating step for the vehicle option premium is based on a modified Black Scholes consisting:

$$Xe^{-rT}N(-d_2) - SN(-d_1)$$

Where S represents a current price of new vehicle,

N( ) represents an area under the normal curve,

X represents said price the user is willing to pay for said new vehicle, r represents a risk-free interest rate, T represents said time to delivery of said new vehicle, σ represents a volatility of the new vehicle logarithmic price, $d_2 = d_1 - \sigma T^{1/2}$ and $d_1 = [\ln(S/X) + (r+\sigma^2/2)T]/\sigma T^{1/2}$.

5. The method according to claim 1, further comprising the steps of:
   receiving an indication that a user has purchased the vehicle option;
   updating a customer database to record purchase of the vehicle option; and
   posting transaction details accessible by all users.

6. The method according to claim 1, further comprising the steps of:
   receiving a user's request to purchase a vehicle utilising user's vehicle option;
   performing a payment transaction to pay the price; and
   updating a database to reflect the vehicle option is used.

7. The method according to claim 1, further comprising the steps of:
   receiving a user's request to sell vehicle using user's vehicle option;
   performing a payment transaction to pay the price; and
   updating a database to reflect the vehicle option is used.

8. A computer program product for use in a system having at least one client workstation and one network server coupled to said network environment, wherein said network environment is a distributed hypermedia environment, the computer program product comprising:
   a computer usable medium having computer readable program code physically embodied therein, said computer program product further comprising:
   computer readable program code implementing the method of claim 1.

9. A computer program product for use in a system having at least one client workstation and one network server coupled to said network environment, wherein said network environment is a distributed hypermedia environment, the computer program product comprising:
   a computer usable medium having computer readable program code physically embodied therein, said computer program product further comprising:
   computer readable program code implementing the method of claim 2.

10. A computer program product for use in a system having at least one client workstation and one network server coupled to said network environment, wherein said network environment is a distributed hypermedia environment, the computer program product comprising:
   a computer usable medium having computer readable program code physically embodied therein, said computer program product further comprising:
   computer readable program code implementing the method of claim 3.

11. A computer program product for use in a system having at least one client workstation and one network server coupled to said network environment, wherein said network environment is a distributed hypermedia environment, the computer program product comprising:
a computer usable medium having computer readable program code physically embodied therein, said computer program product further comprising:
computer readable program code implementing the method of claim 4.

12. A computer program product for use in a system having at least one client workstation and one network server coupled to said network environment, wherein said network environment is a distributed hypermedia environment, the computer program product comprising:
a computer usable medium having computer readable program code physically embodied therein, said computer program product further comprising:
computer readable program code implementing the method of claim 5.

13. A computer program product for use in a system having at least one client workstation and one network server coupled to said network environment, wherein said network environment is a distributed hypermedia environment, the computer program product comprising:
a computer usable medium having computer readable program code physically embodied therein, said computer program product further comprising:
computer readable program code implementing the method of claim 6.

14. A computer program product for use in a system having at least one client workstation and one network server coupled to said network environment, wherein said network environment is a distributed hypermedia environment, the computer program product comprising:
a computer usable medium having computer readable program code physically embodied therein, said computer program product further comprising:
computer readable program code implementing the method of claim 7.

15. A computer system having at least one client workstation and one network server coupled to said network environment, wherein said network environment is a distributed hypermedia environment, the computer implementing the method of claim 1.

16. A computer system having at least one client workstation and one network server coupled to said network environment, wherein said network environment is a distributed hypermedia environment, the computer implementing the method of claim 2.

17. A computer system having at least one client workstation and one network server coupled to said network environment, wherein said network environment is a distributed hypermedia environment, the computer implementing the method of claim 3.

18. A computer system having at least one client workstation and one network server coupled to said network environment, wherein said network environment is a distributed hypermedia environment, the computer implementing the method of claim 4.

19. A computer system having at least one client workstation and one network server coupled to said network environment, wherein said network environment is a distributed hypermedia environment, the computer implementing the method of claim 6.

20. A computer system having at least one client workstation and one network server coupled to said network environment, wherein said network environment is a distributed hypermedia environment, the computer implementing the method of claim 7.

* * * * *